United States Patent [19]

Hayashi

[11] Patent Number: 4,492,284

[45] Date of Patent: Jan. 8, 1985

[54] APPARATUS FOR ARRANGING OIL PRESSURE PUMP IN MOTOR-CYCLE

[75] Inventor: Tsutomu Hayashi, Hoya, Japan

[73] Assignee: Honda Giken Kogyo Kabushiki Kaisha, Tokyo, Japan

[21] Appl. No.: 411,025

[22] Filed: Aug. 24, 1982

[30] Foreign Application Priority Data

Aug. 24, 1981 [JP] Japan .................................. 56-132416

[51] Int. Cl.³ .............................................. B62D 61/02
[52] U.S. Cl. ..................... 180/219; 123/198 C; 222/401; 417/214; 417/313
[58] Field of Search ..................... 180/219; 123/198 C, 123/56 AA, 56 BA; 417/214, 279, 313

[56] References Cited

U.S. PATENT DOCUMENTS

| | | | |
|---|---|---|---|
| 2,612,884 | 10/1952 | Reggio | 123/198 C |
| 2,749,893 | 6/1956 | Porsche et al. | 123/56 AA |
| 3,006,148 | 10/1961 | Hause | 417/214 |
| 3,937,484 | 2/1976 | Morioka et al. | 180/219 |
| 4,006,797 | 2/1977 | Keske | 417/214 |
| 4,086,036 | 4/1978 | Hagen et al. | 417/413 |

OTHER PUBLICATIONS

*Automotive Engineer*, Jun. 1962, pp. 208–211.

Primary Examiner—David M. Mitchell
Assistant Examiner—Kenneth R. Rice
Attorney, Agent, or Firm—Armstrong, Nikaido, Marmelstein & Kubovcik

[57] ABSTRACT

Disclosed is an apparatus for arranging an oil pressure pump in a motor-cycle equipped with an engine consisting of front and rear engine blocks that project to the right and left from a car frame and are deviated from each other in the longitudinal direction of the car frame. The oil pressure pump is disposed at the rear of the front engine block which is curved forward with respect to the frame.

6 Claims, 7 Drawing Figures

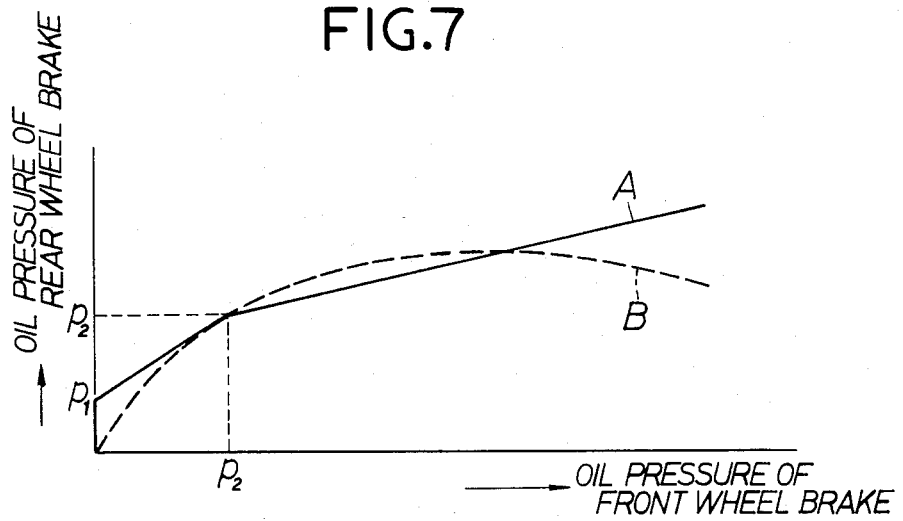

APPARATUS FOR ARRANGING OIL PRESSURE PUMP IN MOTOR-CYCLE

BACKGROUND OF THE INVENTION

1. Field of the Invention

This invention relates to an apparatus for arranging an oil pressure pump in a motor-cycle.

2. Description of the Prior Art

An anti-lock device to be fitted to a brake device of a motor-cycle is equipped with an oil pressure pump for feeding a pressure oil to a pressure accumulator and when the oil pressure pump is mounted at certain positions on the motor-cycle, which generally has only a limited space for positioning of such equipment. Such mounting of the oil pressure pump would impose increased restrictions on the mounting space for other accesorial devices. If the oil pressure pump protrudes sideward from the frame, the appearance of the motor-cycle would be remarkably reduced. In that case, the oil pressure pump could not be protected from any obstacle that might exist in the advancing direction of the motor-cycle.

SUMMARY OF THE INVENTION

It is therefore an object of the present invention to provide an apparatus for arranging an oil pressure pump in a motor-cycle equipped with an engine which includes front and rear engine blocks projecting to the right and left side of the frame and deviated from each other in the longitudinal direction of the frame, which apparatus disposes the oil pressure pump inside a dead space that is unavoidably defined by the shape of the engine, in order to effectively use the dead space.

It is another object of the present invention to provide an apparatus for arranging an oil pressure pump in a motor-cycle, which apparatus prevents the oil pressure pump from projecting sideward from the frame, thus improving the appearance of the motor-cycle and protect the pump from any obstacle that might exist in the advancing direction of the motor-cycle.

To accomplish these objects, the present invention provides an apparatus for arranging an oil pressure pump in a motor-cycle equipped with an engine which includes front and rear engine blocks projecting to the right and left from the frame and deviated from each other in the longitudinal direction of the frame, which apparatus is characterized in that the oil pressure pump is disposed at the rear of the front engine block which is forwardly offset in the longitudinal direction of the frame.

These and other objects, features and advantages of the present invention will become more apparent from the following description to be taken in conjunction with the accompanying drawings.

BRIEF DESCRIPTION OF THE DRAWINGS

The accompanying drawings illustrate one embodiment of the present invention, in which:

FIG. 7 is a diagram showing the brake oil pressure distribution ratio for the front and rear wheel brakes, respectively.

DESCRIPTION OF THE PREFERRED EMBODIMENT

Figure 1:
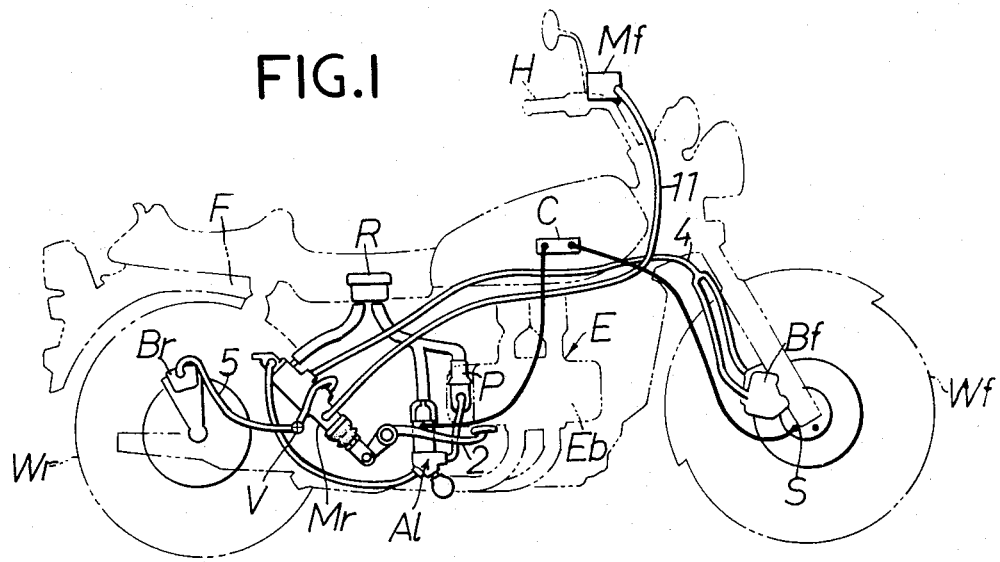
FIG. 1 is a perspective side view of a motor-cycle equipped with a brake device.
Figure 2:
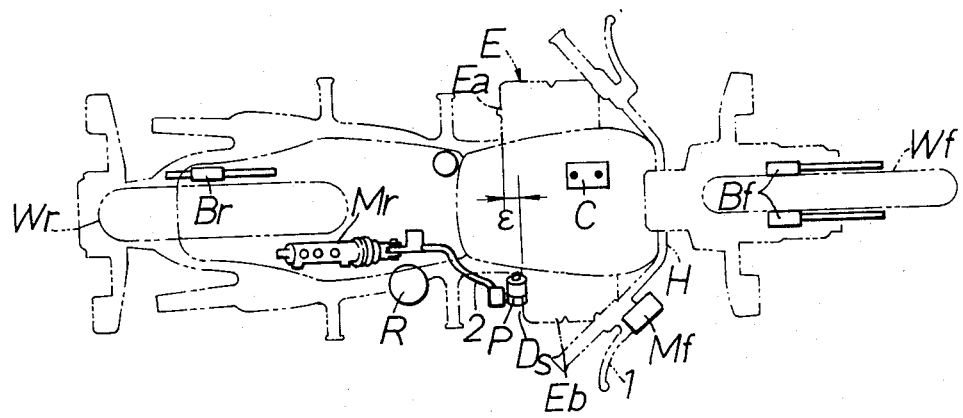
FIG. 2 is a plan view of the motor-cycle equipped with the brake device.

In FIGS. 1 and 2, a motor-cycle is equipped on its steering handle H with a brake lever 1 and a front master cylinder Mf actuated by the brake lever. It also includes at the lower part of it frame F a brake pedal 2 and a rear master cylinder Mr actuated by a brake input from either of the brake pedal 2 and the brake lever 1. The input from the brake lever 1 to the rear master cylinder Mr is given as an output oil pressure of the front master cylinder Mf and the input from the brake pedal 2 to the rear master cylinder Mr is mechanically transmitted as will be described below in further detail.

The rear master cylinder Mr is connected to a pair of right and left oil pressure front wheel brakes Bf for braking the front wheel Wf via an oil passage 4 and is also connected to a single oil pressure rear wheel brake Br for braking the rear wheel Wr via an oil passage 5. A heretofore known proportional reducing valve V is interposed in the oil passage 5.

A horizontally opposed type engine E is mounted to the frame F at its intermediate portion between the front and rear wheels Wf and Wr and an anti-lock brake device Al is mounted at a rear part of the engine E. The anti-lock brake device Al automatically mitigates and recovers only the braking force to be fed to the front wheel brake Bf by controlling the operation of the rear master cylinder Mr at the time of braking. A control signal is generated by a speed sensor S fitted to the front wheel Wf and is sent to the anti-lock brake device through a signal processing unit C.

The construction of each constituent described above will be explained in further detail with reference to FIGS. 3 and 4.

The front master cylinder Mf is of a heretofore known single type. A single piston 8 actuated by the brake lever 1 is slidably fitted into a cylinder bore 7 of a cylinder body 6 to define an oil pressure chamber 9 at the front part of the cylinder bore 7. An oil passage 11 communicating with the rear master cylinder Mr is connected to an output port 10 of this oil pressure chamber 9. Accordingly, when the brake lever 1 is actuated so as to advance the piston 8, an oil pressure is generated inside the oil pressure chamber 9 and is applied through the output port 10 to the rear master cylinder Mr. The cylinder body 6 is equipped integrally with a reservoir 12 capable of supplying operational oil to the oil pressure chamber 9.

Figure 4:
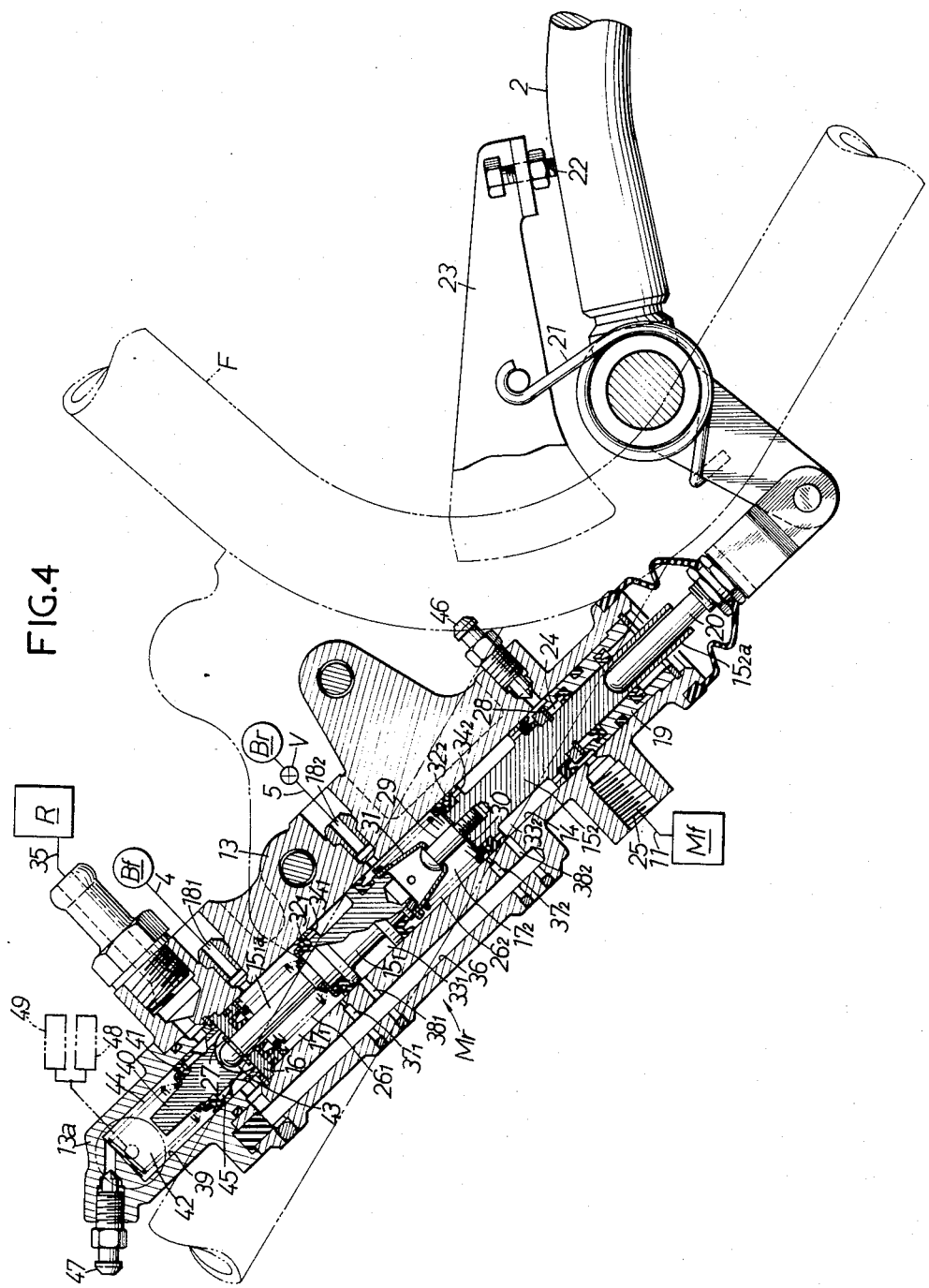
FIG. 4 is an enlarged longitudinal sectional side view of a rear master cylinder in the brake device.

As can be best seen from FIG. 4, the rear master cylinder Mr is of a tandem type. In other words, a first rear cylinder bore 14 and a second front cylinder hole 39 are formed in a cylinder body 13 and are aligned on the same line with a fixed partition wall 16 interposed therebetween. First and second brake pistons $15_1$ and $15_2$ are slidably fitted into the first cylinder bore 14 in an axially aligned manner (in a vertically aligned manner in the drawing). The first brake piston $15_1$ and the fixed partition wall 16 together form a first brake oil pressure chamber $17_1$ between them in the first cylinder bore 14.

Both pistons $15_1$ and $15_2$ form a second brake oil pressure chamber $17_2$ therebetween. The first brake oil pressure chamber $17_1$ has a first output port $18_1$ opening on a side wall of the cylinder body 13 while the second brake oil pressure chamber $17_2$ likewise has a second output port $18_2$ opening on a side wall of the body 13. The oil passage 4 communicating with the front wheel brakes Bf is connected to the first output port $18_1$ and the oil passage 5 communicating with the rear wheel brake Br is connected to the second output port $18_2$.

The second brake piston $15_2$ is integrally equipped with a piston rod $15_{2a}$, which penetrates slidably through a sleeve 19 fitted and fixed to the lower end opening of the first cylinder bore 14, and forming the end wall of the cylinder hole 14, and which projects outside beyond the sleeve 19. The piston rod $15_{2a}$ is interconnected to the brake pedal 2 via a push rod 20 so that when the brake pedal 2 is depressed, the second brake piston $15_2$ is pushed forward (upward in the drawing) via the push rod 20. Reference numeral 21 represents a return spring for the brake pedal 2 and reference numeral 22 represents a stopper bolt which restricts the limit of returning movement of the pedal 2 and is screwed to a bracket 23 extending from the frame F so as to be capable of adjusting the limit of the returning movement of the pedal 2.

The second brake piston $15_2$ and the sleeve 19 together form an input oil pressure chamber 24 between them inside the first cylinder bore 14. The aforementioned oil passage 11 communicating with the front master cylinder Mf is connected to an input port 25 opening to one side of this oil pressure chamber 24 so that the second brake piston $15_2$ is pushed forward by the oil pressure which is fed through the input port 25 into the oil pressure chamber 24. Accordingly, the rear face of the second brake piston $15_2$ exposed to the oil pressure chamber 24 forms a first pressure-receiving portion while the piston rod $15_{2a}$ forms a second pressure-receiving portion.

The first and second brake oil pressure chambers $17_1$ and $17_2$ incorporate therein first and second return springs $26_1$ and $26_2$ for urging the first and second brake pistons $15_1$ and $15_2$ in the backward direction, or downward direction, respectively. In this case, the set load of the second return spring $26_2$ is smaller than that of the first return spring $26_1$. A circular clip-like stopper 27 is anchored to the tip of the piston rod $15_{1a}$ projecting from the front surface of the piston $15_1$ and slidably penetrating through the partition wall 16 in order to restrict the limit of the backward movement of the first brake piston $15_1$. This stopper 27 comes into contact with the upper surface of the partition wall 16. A circular clip-like stopper 28 coming into contact with the upper end surface of the sleeve 19 is likewise anchored to the piston rod $15_{2a}$ of the piston $15_2$ so as to restrict the limit of the backward movement of the second brake piston $15_2$.

The second return spring $26_2$ is placed under the compressed state between a fixed seat 30, which is fixed to the upper end of the second brake piston $15_2$ by a bolt 29, and a movable seat 31 which can slide on the bolt 29 within a limited range of stroke. The movable seat 31 substantially comes into contact with the lower end of the first brake piston $15_1$ when the former is spaced apart by a maximal distance from the fixed seat 30, that is, when both brake pistons $15_1$ and $15_2$ are positioned at the limit of their backward movement.

The first and second brake pistons $15_1$ and $15_2$ are equipped on their front surfaces with piston caps $32_1$ and $32a$, respectively, and have reduced diameter at their intermediate portions so that oil feed chambers $33_1$ and $33_2$ are defined around the reduced diameter portions, respectively. Feed oil holes $34_1$ and $34_2$ are bored on the brake pistons $15_1$ and $15_2$ for communicating the backs of the piston caps $32_1$ and $32_2$ with these oil chambers $33_1$ and $33_2$, respectively.

An oil passage 36 communicating with an oil passage 35, which in turn communicates with the reservoir R, is bored on the cylinder body 13 in parallel with the first and second cylinder bores 14 and 39. The oil passage 36 communicates with relief ports $37_1$, $37_2$ which open to the first and second brake oil pressure chambers $17_1$, $17_2$ at such positions that the piston caps $32_1$, $32_2$ come immediately behind those parts when the brake pistons $15_1$ and $15_2$ are retracted to their limit. The oil passage 36 also communicates with supply ports $38_1$ and $38_2$ which are always open to the oil feed chambers $33_1$ and $33_2$.

The second cylinder bore 39 is bored on the cylinder cap $13_a$ that forms the front end portion of the cylinder bodies 13. A brake piston 40 equipped with a piston cap 41 on its front surface is slidably fitted into this cylinder bore 39. The piston 40 opposes the tip of the piston rod $15_{1a}$ of the first brake piston $15_1$. A front control oil pressure chamber 42 is defined between the control piston 40 and the end wall of the second cylinder bore 39, that is, the top wall of the cylinder cap $13a$. Similarly, a rear oil feed chamber 43 is defined between the control piston 40 and the partition wall 16. The control piston 40 is normally held at the limit of its backward movement while kept in contact with the partition wall by a return spring 44 which is placed under compressed state in the control oil pressure chamber 42. The oil feed chamber 43 communicates with the reservoir R via the oil passage 35 in the same way as the aforementioned oil feed chambers $33_1$ and $33_2$. An oil feed hole 45 for communicating the chamber 43 with the back of the piston cap 41 is bored in the control piston 40. In FIG. 4, reference numerals 46 and 47 represent air bleeders.

The anti-lock brake device Al consists of the aforementioned control piston 40, a pair of normally-closed electromagnetic control valve 48 and normally-open electromagnetic control valve 49 for controlling the operation of the control piston 40, a pressure accumulator Ac for storing the operation oil pressure for the control piston 40 and an oil pressure pump P for feeding the pressure oil to this pressure accumulator Ac. The normally-closed control valve 48 is interposed in an oil passage 50 connecting the oil pressure pump P and the pressure accumulator Ac to the control oil pressure chamber 42 described above and the normally-open control valve 49 is interposed in an oil passage 51 connecting the reservoir R to the control oil pressure chamber 42. In FIG. 3, reference numerals 52, 53 and 54 represent oil filters disposed in the oil passage 50, 51 in front and at the rear of the control valves 48 and 49 and reference numeral 55 represents an oil filter disposed immediately after a discharge port 57 of the oil pressure pump P. Reference numeral 56 represents an oil passage connecting an intake port 58 of the oil pressure pump P to the reservoir R.

Next, the oil pressure pump P will be described.

The oil pressure pump P is mounted to the outer surface of the engine E. As shown in FIG. 2, a pair of integral engine blocks Ea and Eb of the horizontally-opposed type engine E, each consisting of a cylinder head and a cylinder block, project to the right and left sides from the car frame F, and the oil pressure pump P is mounted to the back of the front engine block Eb which is offset forward in the longitudinal direction of the frame. This arrangement makes it possible to utilize a dead space Ds for mounting the oil pressure pump P, the dead space Ds being defined at the rear of the front engine block Eb due to the deviation ε between the front and rear engine blocks Eb and Ea in the longitudinal direction of the car frame F. Since the oil pressure pump does not project sideward from the frame F, this arrangement improves the appearance of the motorcycle and protects the oil pressure pump P from any obstacle that might exist in the forward direction of the frame F.

Figure 5:
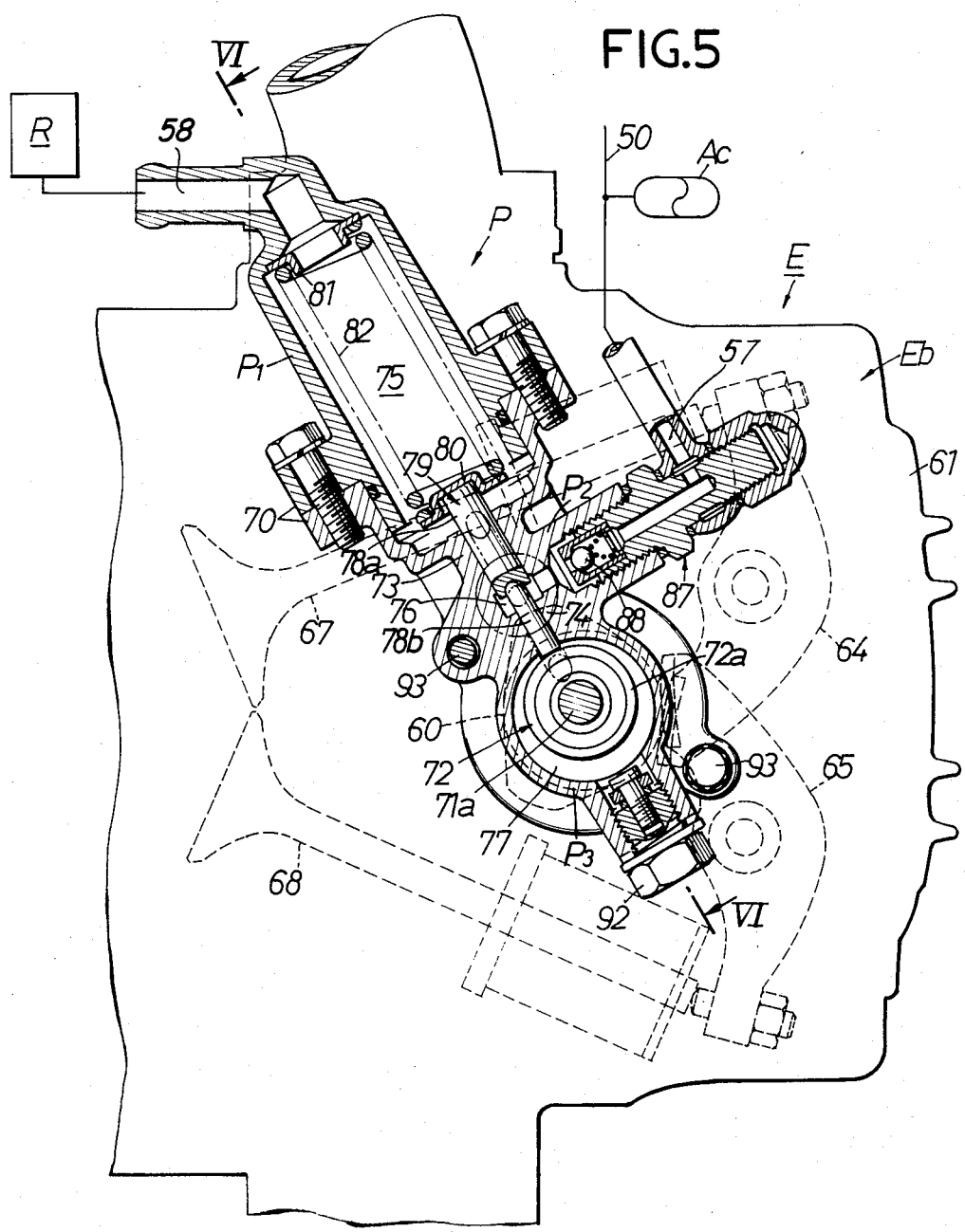
FIG. 5 is an enlarged longitudinal sectional rear view of an oil pressure pump in the brake device when the brake device is mounted to an engine.
Figure 6:
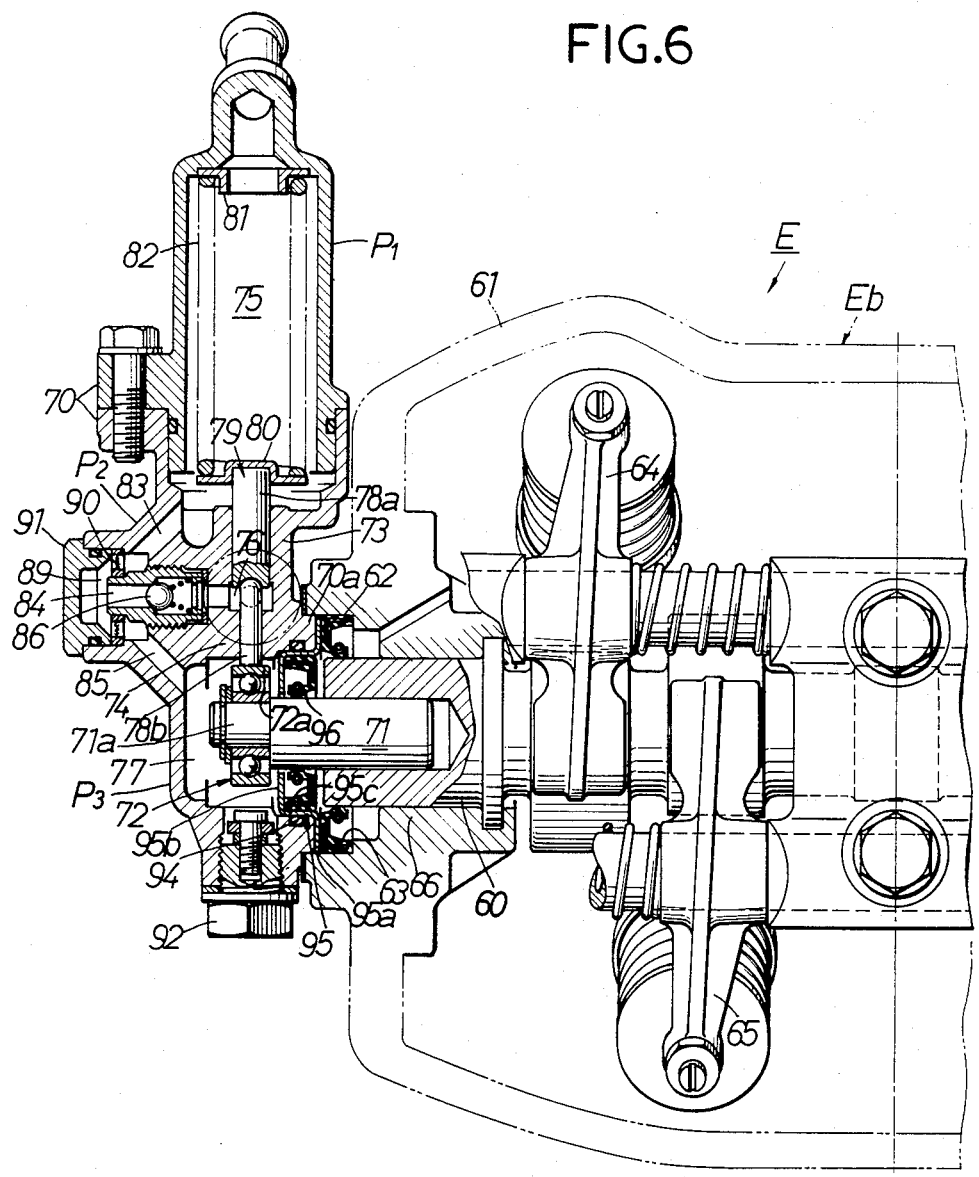
FIG. 6 is a sectional view taken along line VI—VI of FIG. 5.

As shown in FIGS. 5 and 6, an overhead type valve motion cam shaft 60 is disposed on the cylinder head of the engine block Eb and one end portion of this cam shaft 60 is turnably supported by a bearing 66 on the rear wall of the engine main body 61. The oil pressure pump P is fitted to the engine main body 61 so that it is actuated by the valve motion cam shaft 60.

The inside of a pump main body 70 of this oil pressure pump P is divided from above into an oil reservoir/-spring chamber 75, a pump chamber 76 and an operation chamber 77 by a pair of upper and lower partition walls 73 and 74 and are accommodated in these chambers 75, 76 and 77 various constituents that will be later described. Thus, the oil pressure pump P has a longitudinally elongated configuration and consists of an oil reservoir portion $P_1$ at the upper portion for, a pump portion $P_2$ positioned at the intermediate portion, sucking the operation oil from inside the oil reservoir portion $P_1$ and discharging it outside and an operation portion $P_3$ positioned at the lower portion and applying the pumping operation to the pump portion $P_2$.

The tip of a pump driving shaft 71 having a relatively small diameter is placed inside the operation chamber 77 and the base end of the driving shaft 71 is fixed to the outer end portion of the valve motion cam shaft 60. An eccentric pin 71a is formed at the tip of the driving shaft 71 and an antifriction bearing to serve as an eccentric cam 72, e.g. a ball-and-roller bearing, is fitted to the pin 71a. Since a heretofore known type can be used as the antifriction bearing, the eccentric cam can be obtained extremely easily.

A plunger 79 is of a double split type consisting of a large diameter shaft portion 78a and a small diameter shaft portion 78b having a sufficiently reduced diameter in comparison with the diameter of the former 78a and the lower end of the small diameter shaft portion 78b engages with the outer circumference of the eccentric cam 72. The small diameter shaft portion 78b slidably penetrates through the partition wall 74 and projects into the pump chamber 76. Then, it comes into contact with the lower end of the large diameter shaft portion 78a which slidably penetrates through the partition wall 73. The upper end of the large diameter shaft portion 78a projecting into the spring chamber 75 is equipped with a movable seat 80 while the ceiling of the spring chamber 75 is equipped with a fixed seat 81. A spring 82 is placed under compressed state between these seats 80 and 81 with a predetermined set load.

The spring chamber 75 is communicated with the reservoir R via the oil passage 56 while the pump chamber 76 is communicated with the pressure accumulator Ac via the oil passage 50.

First and second oil passages 83 and 84 are formed on the partition wall 73 so as to communicate the spring chamber 75 with the pump chamber 76 and a unidirectional valve which allows the passage of a fluid in only one direction from the spring chamber 75 to the pump chamber 76, that is, a suction valve 86, is disposed in the second oil passage 84. Another unidirectional valve which allows the passage of flow in only one direction from the pump chamber 76 to the accumulator Ac, that is, a discharge valve 88, is disposed in a flow passage inside a joint 87 that connects the pump chamber 76 to the oil passage 50.

An oil passage 85 is formed in the partition wall 73 so as to communicate the spring chamber 75 with the operation chamber 77 so that the operation oil flowing into the spring chamber 75 is introduced into the operation chamber 77 as a lubricant.

A filter chamber 89 opening outside is defined in the pump main body 70 in the vicinity of the partition wall 73 and the first through third oil passages 83, 84, 85 together inside the filter chamber 89. An oil filter 90 is placed inside the filter chamber 89 so as to separate the second oil passage 84 equipped with the suction valve 86 from the first and third oil passages 83 and 85 inside the filter chamber 89. A detachable cap 91 for closing the opening of the filter chamber 89 holds the oil filter 90 in place. Accordingly, the suction valve 86 can always feed the operation oil, that is filtered by the oil filter 90, to the pump chamber 76. The oil filter 90 can be easily inspected or replaced after the cap 91 is removed. Air vent of the pump chamber 76 can also be effected easily by deliberately opening the section valve 86. Incidentally, reference numeral 92 in FIG. 6 represents a drain bolt of the operation chamber 77.

A seal housing 63 is formed on the outer surface of the side wall of the engine main body 61 so as to coaxially encompass the valve motion cam shaft 60 and the oil seal 62 of an shaft 60 is fitted to the seal housing 63. An annular locating protuberance 70a is protrusively formed on the outer surface of the side wall of the pump main body 70 so as to coaxially encompass the pump driving shaft 71. The protuberance 70a is fitted to the seal housing 63 of the engine main body 61. This arrangement makes it possible to correctly locate the oil pressure pump P to the engine main body 61 and to normally operate the pump P. Since the seal housing 63 is used for locating the oil pressure pump P, no locating member is need, in particular, and the construction can be simplified.

The protuberance 70a transmits the reaction of the operating force of the eccentric cam 72 acting upon the pump main body 70 to the engine main body 61 to let the latter (61) bear the reaction. Hence, a bolt 93 does not undergo deflection upon receiving the reaction. After the locating protuberance 70a is fitted, the upper end portion of the pump main body 70, that is, the portion of the main body on the side of the spring chamber 76, is inclined toward the car frame or in a direction to the center of the engine E and is then fixed to the engine main body 61 by the bolt 93. The oil pressure pump P can be concealed behind the front engine block Eb and does not become an unnecessary protuberance on the side of the car frame F. The oil passages between the oil pressure pump P and the reservoir R and between the pump P and the pressure accumulator Ac can be shortened and the feed efficiency of the operation oil to these constituents can be improved.

A seal retainer 95 is equipped with a cylindrical portion 95c and outward and inward flanges 95a and 95b formed at both open edges of the portion 95c. The cylindrical portion 95c is fitted to the inner circumference of the locating protuberance 70a via a seal ring 94. The outward flange 95a is fitted to the seal housing 63 and functions as a centering member for holding the seal retainer 95 concentrically with the pump driving shaft 71. The outward flange 95a is clamped between both edge surfaces of the locating protuberance 70a and the oil seal 62. The inward flange 95b is interposed between the eccentric cam 72 and an oil seal 96 so as to serve as a stop member which leaves the seal retainer 95 on the side of the pump driving shaft 71 when the pump main body 70 is removed.

Accordingly, the oil seals 62 and 96 are always held on the valve motion cam shaft 60 and the pump driving shaft 71 by the oil retainer 95. Thus, they neither come off and undergo damage when the pump main body 70 is removed, nor leak the lubricant of the engine E or the operation oil inside the operation chamber 77 in the oil pressure pump P to the outside. The pump driving shaft 71 has a diameter smaller than that of the valve motion cam shaft 60 and its sliding speed with respect to the oil seal 96 during rotation is lower. Hence, the oil seal 96 has higher durability.

The position of engagement between the eccentric cam 72 of the oil pressure pump P and the plunger 79 is such that when the oil pressure pump is mounted, the phase of the engagement on the circumference is greatly deviated from the positions of engagement between the valve motion cam shaft 60 of the engine E and an intake rocker arm 64 and between the cam shaft 60 and an exhaust rocker arm 65, as shown in FIG. 5. This arrangement distributes the load acting upon the valve motion cam shaft 60 and upon the bearing 66 supporting the cam shaft 60 improving their durability. Incidentally, reference numerals 67 and 68 represent intake and exhaust valves that are made open by the valve motion cam shaft 60 via the rocker arms 64 and 65, respectively.

Next, the operation of this embodiment will be described.

Figure 3:
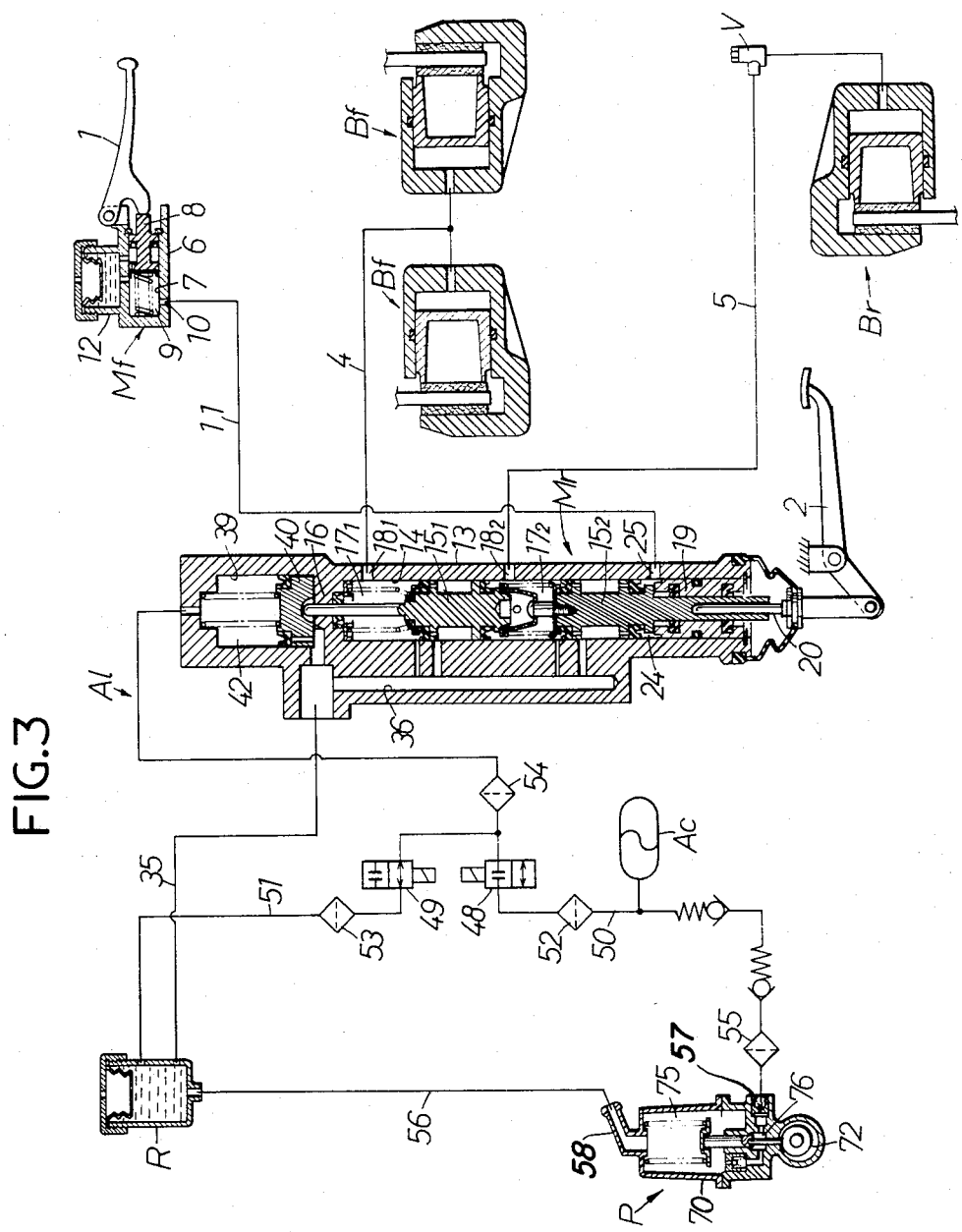
FIG. 3 is an oil pressure circuit diagram of the brake device.

Referring initially to FIGS. 3 and 4, when the front master cylinder Mf is actuated by the brake lever 1, the oil pressure developed inside its oil pressure chamber 9 is applied from the input port 25 to the oil pressure chamber 24 of the rear master cylinder Mr via the oil passage 11. This oil pressure pushes forward the second brake piston $15_2$ and its reaction is borne by the sleeve 19 but is not transmitted to the push rod 20.

When the brake pedal 2 is stepped, the pedalling force is mechanically applied to the second brake piston $15_2$ via the push rod 20, pushing forward the second brake piston $15_2$. The input oil pressure chamber 24 whose volume increases at this time sucks only the operation oil from the reservoir R of the front master cylinder Mf through the oil pressure chamber 9 and the oil passage 11. Hence, no reaction force acts upon the brake pedal 1.

When both brake lever 1 and brake pedal 2 are simultaneously operated, the sum of the push force resulting from the output oil pressure of the front master cylinder Mf and the push force resulting from the push rod 20 is applied as the brake input to the second brake piston $15_2$.

When the second brake piston $15_2$ receives a brake input such as described above, the first and second brake pistons $15_1$ and $15_2$ advance while compressing the first and second return springs $26_1$ and $26_2$, and after their piston caps $32_1$ and $32_2$ pass by the relief ports $37_1$ and $37_2$, the oil pressure is generated inside the first and second brake oil pressure chambers $17_1$ and $17_2$ in accordance with the advancing distances of the brake pistons $15_1$ and $15_2$. The oil pressure generated inside the first brake oil pressure chamber $17_1$ is transmitted from the first output port $18_1$ through the oil passage 4 to the front wheel brakes Bf to actuate them and the oil pressure generated inside the second brake oil pressure chamber $17_2$ is transmitted from the second output port $18_2$ through the oil passage 5 to the rear wheel brake Br to actuate it, applying the braking force to the front and rear wheels Wf and Wr, respectively.

As described already, the set load of the second return spring $26_2$ is smaller than that of the first return spring $26_1$. At the initial stage of operation of the second brake piston $15_2$, therefore, the second return spring $26_2$ is compressed before the advance of the first brake piston $15_1$ and the oil pressure is first generated inside the second brake oil pressure chamber $17_2$. When its oil pressure reaches a pedetermined value $p_1$, the first return spring $26_1$ is then compressed and the first brake piston $15_1$ starts advancing, generating the oil pressure inside the first brake oil pressure chamber $17_1$. Since the known proportional reducing valve V is disposed in the oil passage 5 between the output port $18_2$ of the second brake oil pressure chamber $17_2$ and the rear wheel brake Br, when the output oil pressure of the second output port $18_2$ reaches a predetermined value $p_2$, the output oil pressure is reduced to a predetermined ratio by the proportional reducing valve V and is then transmitted to the rear wheel brake Br. On the other hand, since the oil passage 4 between the output port $18_1$ of the first brake oil pressure chamber $17_1$ and the front wheel brake Bf is kept always conductive, the output oil pressure of the first output port $18_1$ is transmitted without modification to the front wheel brakes Bf. As a result, the brake oil pressure of each of the front and rear wheel brakes Bf and Br rises along the brake oil pressure distribution line A shown in FIG. 7. This characteristic is approximate to an ideal brake oil pressure distribution curve B for a motor-cycle and the driver of the motor-cycle can brake easily and efficiently.

At the time of braking, the control piston 40 is also advanced via the piston rod $15_{1a}$ along with the advance of the first brake piston $15_1$. Since the control oil pressure chamber 42 is normally communicated with the reservoir R via the normally-open control valve 49, however, the operation oil inside the control oil pressure chamber 42 is discharged toward the reservoir R along the advance of the control piston 40 and hardly acts as the resistance against the brake input.

If the front wheel is about to cause lock along with brake, the signal processing unit C shown in FIG. 1 rapidly judges the situation from the incoming signal generated by the front wheel speed sensor S and sends a valve closing signal to the normally-closed control valve 49 and a valve opening signal to the normally-closed control valve 48 shown in FIG. 3. When both control valves 48 and 49 operate as instructed by the respective signals, the oil passage 51 is cut off and at the same time, the oil passage 50 becomes conductive so that the pressure oil from the pressure accumulator Ac is supplied to the control oil pressure chamber 42 through the oil passage 50 and this oil pressure slightly moves back the first control piston $15_1$ via the control piston 40 against the brake input, thus reducing the internal pressure of the first brake oil pressure chamber 17₁. As a result, the braking force of the front wheel brakes Bf drops and the lock phenomenon of the front wheel Wf is avoided.

Thereafter, the signal processing unit C detects the situation, returns both control valves 48 and 49 to their normal positions and reduces the pressure of the control oil pressure chamber 42. In consequence, the braking force of the front wheel brakes Bf again increases, and since sequence of the operation is repeated at a high speed, the front wheel Wf can be efficiently braked without causing lock.

The backward movement of the first brake piston $15_1$ by the operation of the control piston 40 raises the internal pressure of the second brake oil pressure chamber $17_2$ on the contrary but since the pressure rise is instantaneous, it is deformed by elastic deformation of each portion of the oil pressure system of the rear wheel brake Br, thereby not deteriorating the operation feeling of the brake lever 1 and that of the brake pedal 2.

In this manner, the braking force of the rear wheel brake Br can be freely adjusted even while the antilock brake device Al controls the braking force of the front wheel brake Bf, by adjusting the braking input to the second brake piston $15_2$.

When both brake lever 1 and brake pedal 2 are released so as to release the brake of the front and rear wheels Wf and Wr, the first and second brake pistons $15_1$ and $15_2$ are moved back by the force of the first and second return springs $26_1$ and $26_2$. When the internal pressure of the first and second brake oil pressure chambers $17_1$ and $17_2$ drops below the atmospheric pressure along therewith, the outer circumference of the piston caps $32_1$ and $32_2$ contract due to the pressure difference between these oil chambers $17_1$, $17_2$ and the oil feed chambers $33_1$, $33_2$ which are at the atmospheric pressure, forming thereby a gap between the inner wall of the first cylinder bore 14 and the caps $32_1$, $32_2$, respectively. Hence, the oil is fed to the brake oil pressure chambers $17_1$ and $17_2$ from the oil feed chambers $33_1$ and $33_2$ through the oil feed holes $34_1$ and $34_2$ and the excess oil is returned to the reservoir through the oil passage 35 from the relief ports $37_1$ and $37_2$. In the interim, the oil is fed to the oil feed chambers $33_1$ and $33_2$ from the oil passage 36 through the supply ports $38_1$ and $38_2$.

On the other hand, when the control piston 40 moves back, too, the oil is supplied from the oil feed chamber 43 to the control oil pressure chamber 42 through the oil feed hole 45 in the same way as described above. Accordingly, especially because the control piston 40 reciprocates, the oil circulates in the route consisting of the control oil pressure chamber 42, the oil passage 51, the reservoir R, the oil passage 35, the oil feed chamber 43, the oil feed hole 45 and the control oil pressure chamber 42 and hence, any bubbles are prevented from remaining inside the control oil pressure circuit including the control oil pressure chamber 42.

Next, the operation of the oil pressure pump P will be described. When the valve motion cam shaft 60 rotates and hence, when the pump driving shaft 71 rotates due to the operation of the engine E, the eccentric cam 72 which causes eccentric motion in accordance with with the rotation of the driving shaft 71 applies vertical reciprocating motion to the plunger 79 in cooperation with the spring 82. This reciprocation causes repeated swelling and contraction of the volume of the pump chamber 76. At the time of swelling, the internal pressure of the pump chamber 76 is reduced and the suction valve 86 opens so that the operation oil fed from the reservoir R to the spring chamber 75 is sucked into the pump chamber 76. At the time of contraction, the internal pressure of the pump chamber 76 increases and the discharge valve 88 opens so that the pressure oil is supplied from the pump chamber 76 to the accumulator Ac.

The outer face 72a of the eccentric cam 72, which causes reciprocating motion of the plunger 79 in the manner described above, receives the force of the spring 82 during motion of the cam 72 via the plunger 79 and hence, it hardly rotates. It is thus possible to minimize sliding between the outer face 72a and the small diameter shaft portion 78b of the plunger 79 and to prevent wearout of their engaging portions. The driving torque for reciprocating the plunger 79 can also be reduced. When the oil pressure inside the pressure accumulator Ac rises and reaches a predetermined value, the oil pressure inside the pump chamber 76 shows a similar value and the push-up force of this oil pressure relative to the large diameter shaft portion 78a of the plunger 79 balances with the push-down force of the spring 82, that is, the set load, thereby keeping the large diameter shaft portion 78a in a position close to the limit of rise by the small diameter shaft portion 78b. Hence, only the small diameter shaft portion 78b repeats vertical motion while following up the movement of the eccentric cam 72. In this case, the push-down force of the small diameter shaft portion 78b is given by the oil pressure inside the pump chamber 76 so that the suction valve 86 is kept closed by the oil pressure inside the pump chamber 76 irrespective of downward movement of the small diameter shaft portion 78b. Thus, the oil pressure pump P stops its pumping operation and does not apply an unnecessary load to the engine E. The push force by the oil pressure inside the pump chamber 76 acts upon the engaging surface between the small diameter shaft portion 78b and the eccentric cam 72 but this push force is negligible as the load to the engine E because the diameter of the small diameter shaft portion 78b is sufficiently small.

Additionally, the present invention can be also applied to a motor-cycle to which a V-shaped engine is mounted.

What is claimed is:

1. In an apparatus for arranging an oil pressure pump in a motor-cycle having mounted thereto an engine equipped with front and rear engine blocks projecting to the right and left from a vehicle frame and positioned so as to deviate from each other in the longitudinal direction of the vehicle frame, the improvement wherein said oil pressure pump is disposed at the rear of said front engine block which is offset, in the forward direction of the vehicle frame, said front engine block having an overhead cam shaft mounted thereon with its axis extending in the longitudinal direction of the vehicle frame, the rear end of said cam shaft being operatively connected to an operation portion of said oil pressure pump for power transmission therebetween.

2. The apparatus for arranging an oil pressure pump as defined in claim 1 wherein said oil pressure pump has a longitudinally elongated configuration including a pump portion in addition to said operation portion, said oil pressure pump is angled inwardly toward the center line of said engine from its operation portion connectd to said cam shaft.

3. The apparatus for arranging an oil pressure pump as defined in claim 2 wherein said front engine block is equipped with a seal housing disposed on the outer surface of the rear wall of said front engine block, said seal housing encompassing coaxially said rear end of said cam shaft, and with an oil seal for said cam shaft, fitted into said seal housing; said operation portion of the oil pressure pump is equipped with an eccentric cam to be placed inside a main body of said oil pressure pump at an inner end thereof and with a pump driving shaft having an outer end fixed to said cam shaft; said pump main body is equipped with an annular locating protuberance which is so protruded as to encompass coaxially said pump driving shaft and is fitted to said seal housing and with an oil seal of said pump driving shaft being fitted into said protuberance; and said pump main body is fixed to said front engine block by bolts.

4. The apparatus for arranging an oil pressure pump as defined in claim 2 or 3 wherein said pump portion of the oil pressure pump is equipped with a plunger which engages with said eccentric cam for reciprocating movement and the position of engagement of said plunger with said eccentric cam is deviated in the circumferential direction of said valve motion cam shaft with respect to the positions of engagement of said valve motion cam shaft with intake and exhaust rocker arms, respectively.

5. The apparatus for arranging an oil pressure pump as defined in claim 3 wherein said eccentric cam is an antifriction bearing fitted to an eccentric pin projecting from the rear end surface of said pump driving shaft.

6. The apparatus for arranging an oil pressure pump as defined in claim 2 wherein said pump main body of the oil pressure pump includes an oil reservoir chamber and a pump chamber that are separated from each other by a partition wall, and an outwardly opening filter chamber formed in the vicinity of said partition wall; said partition wall is provided therein with a first oil passage communicating said filter chamber with said oil reservoir chamber and with a second oil passage communicating said filter chamber with said pump chamber; an oil filter is disposed inside said filter chamber so as to separate said first and second oil passage from each other, said oil filter being held in place by a detachable cap for closing the opening of said filter chamber; and a suction valve is interposed in said second oil passage so as to allow the passage of an operation oil only undirectionally from said filter chamber to said pump chamber.

* * * * *